United States Patent Office 2,925,067
Patented Feb. 16, 1960

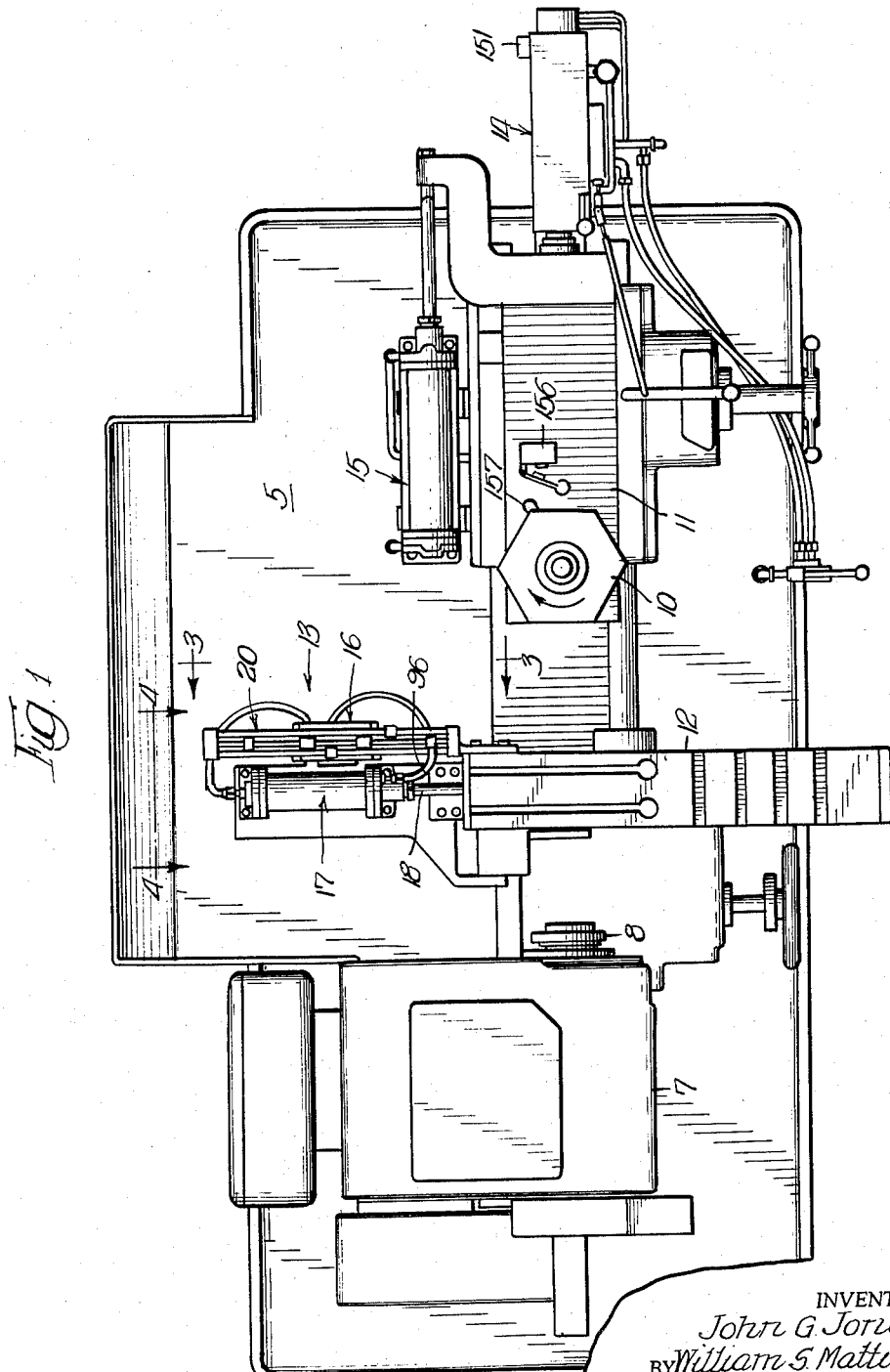

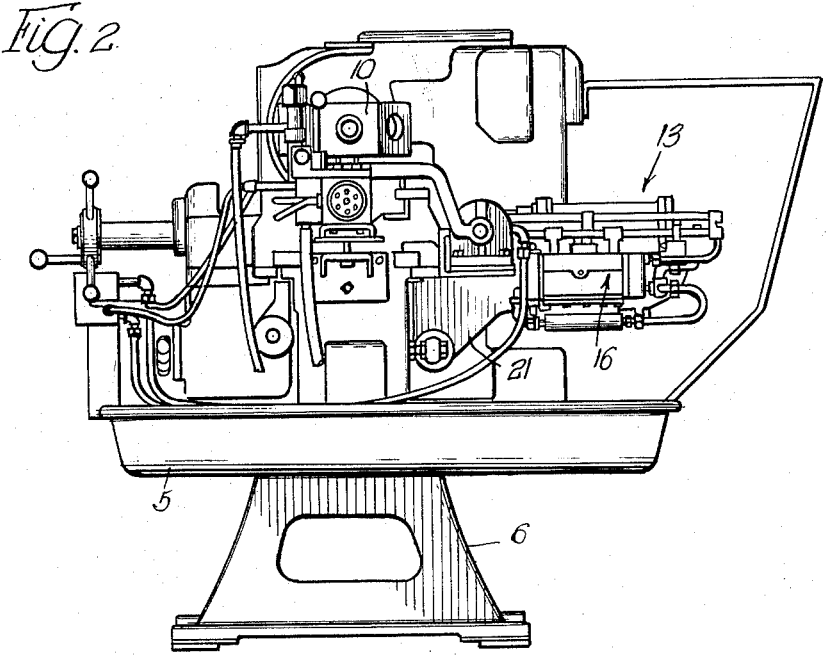
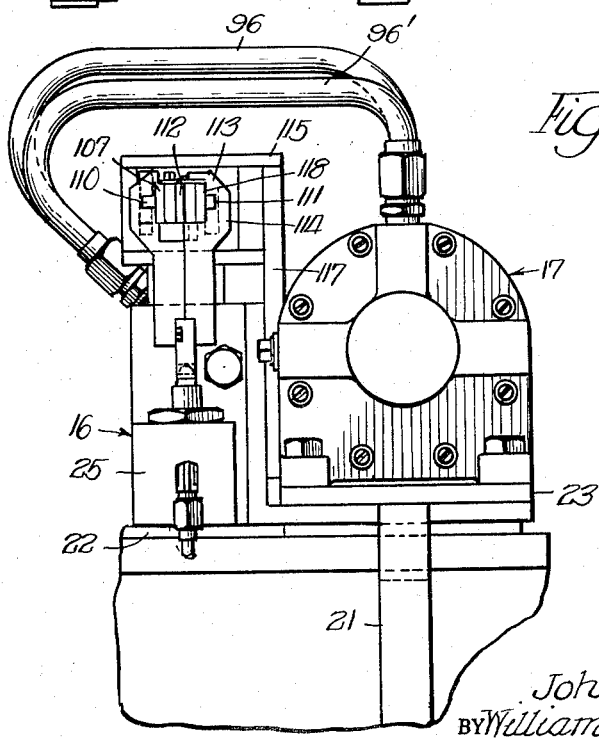

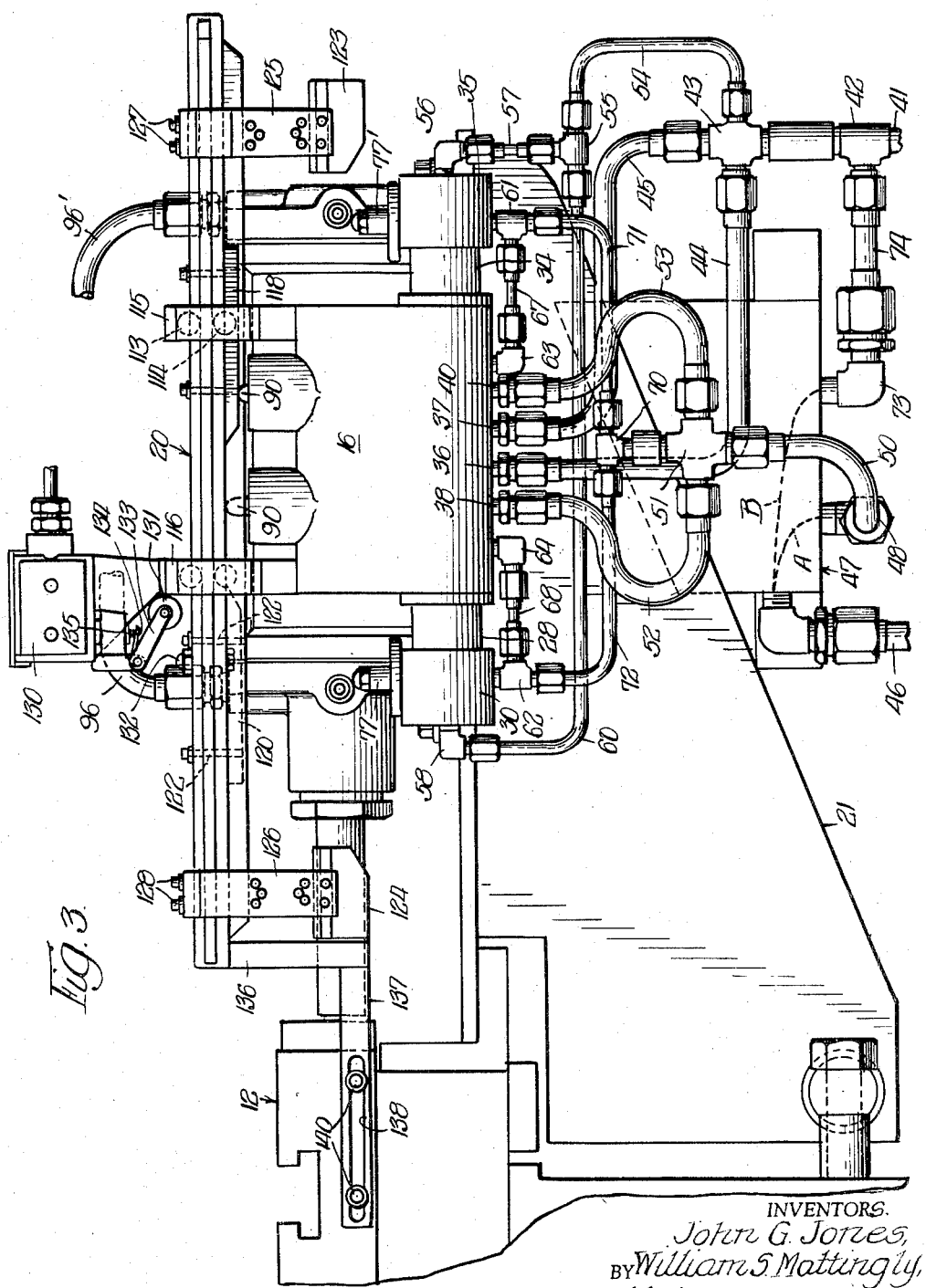

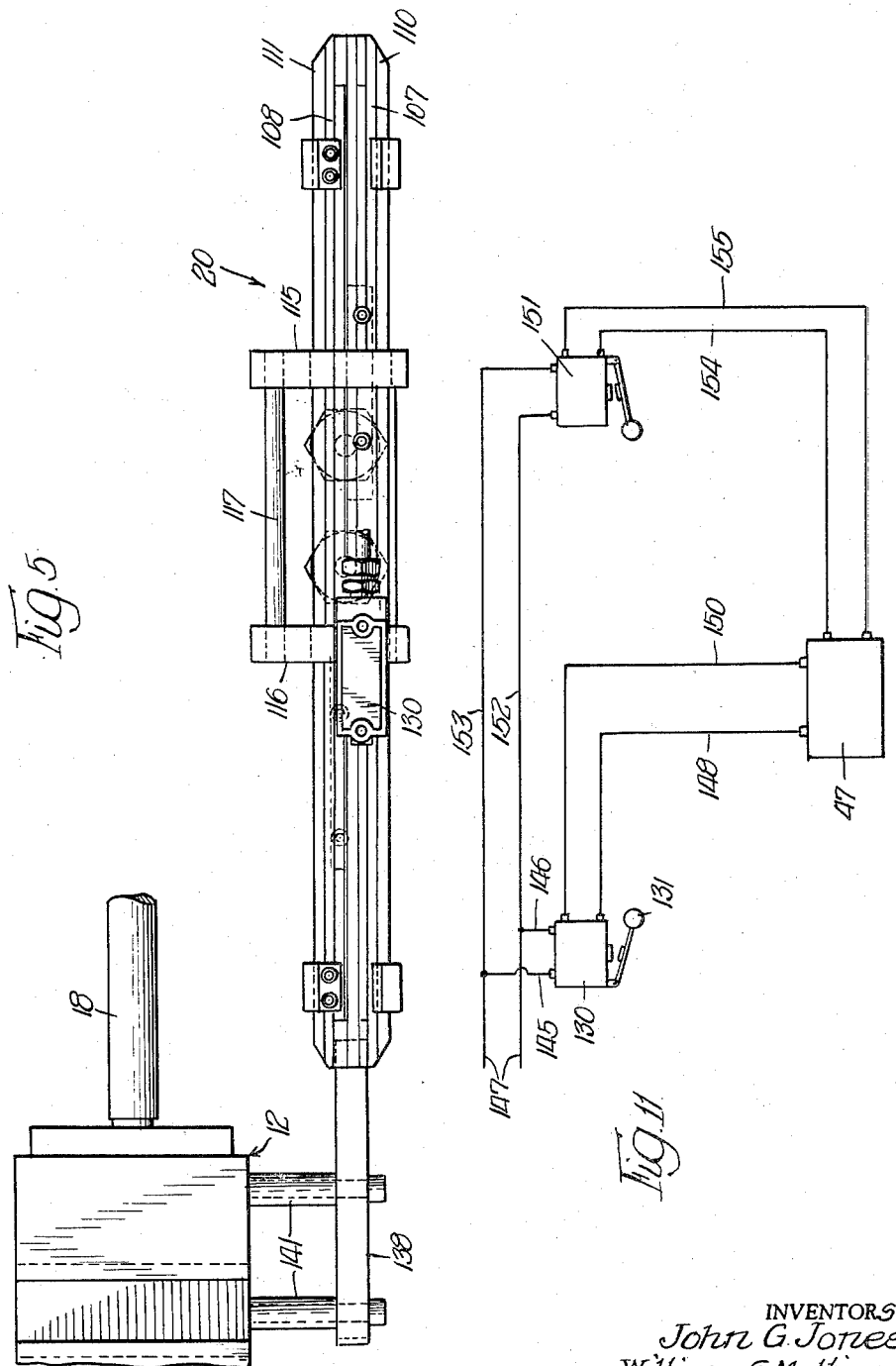

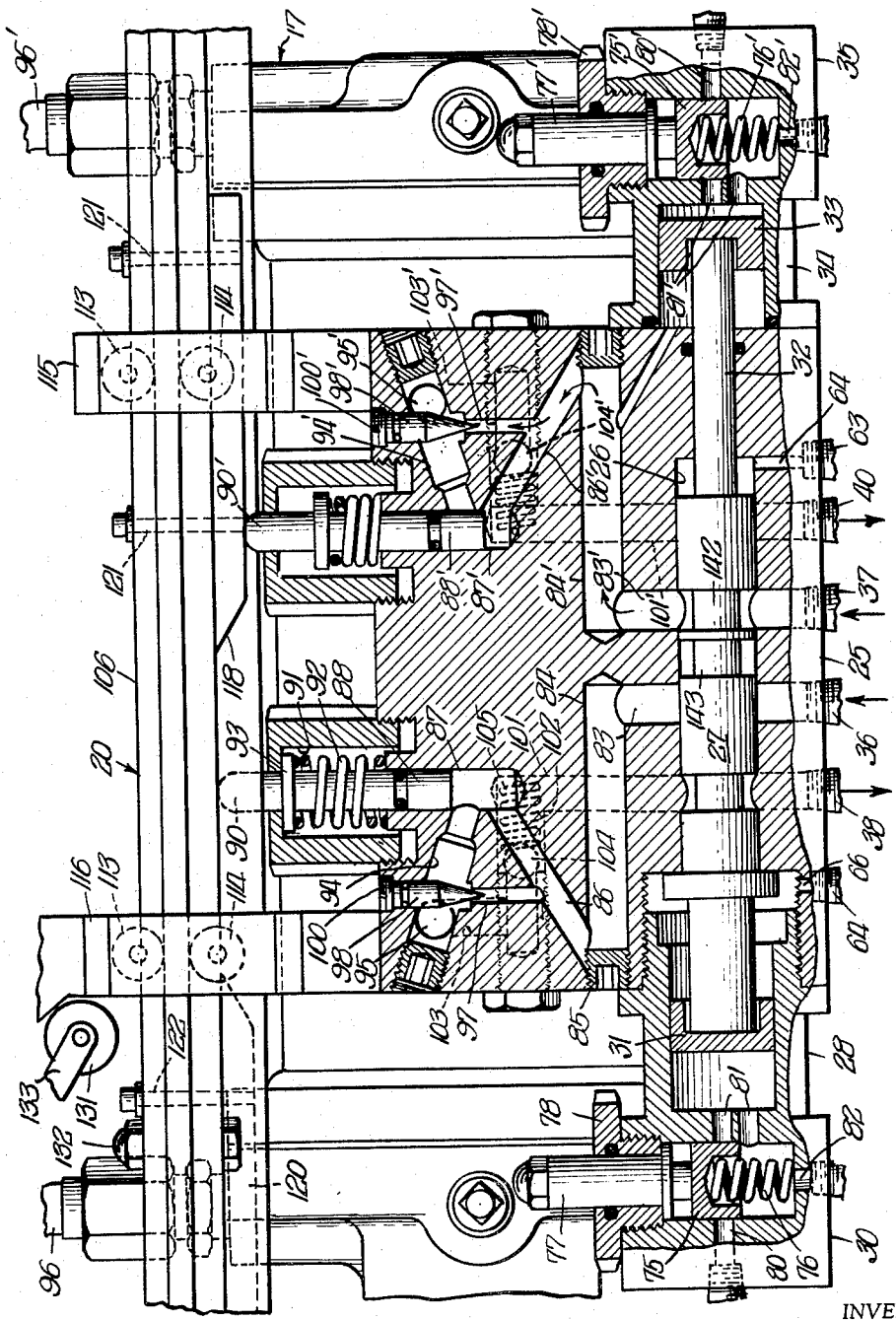

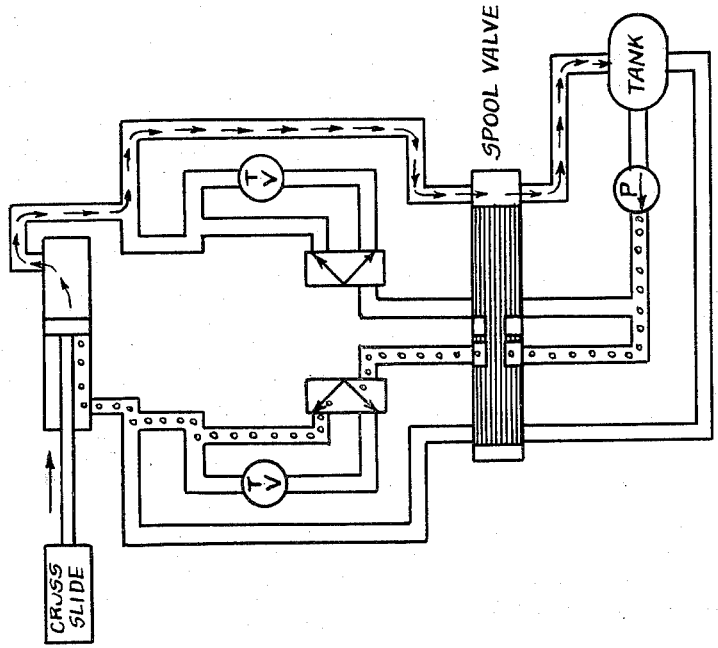
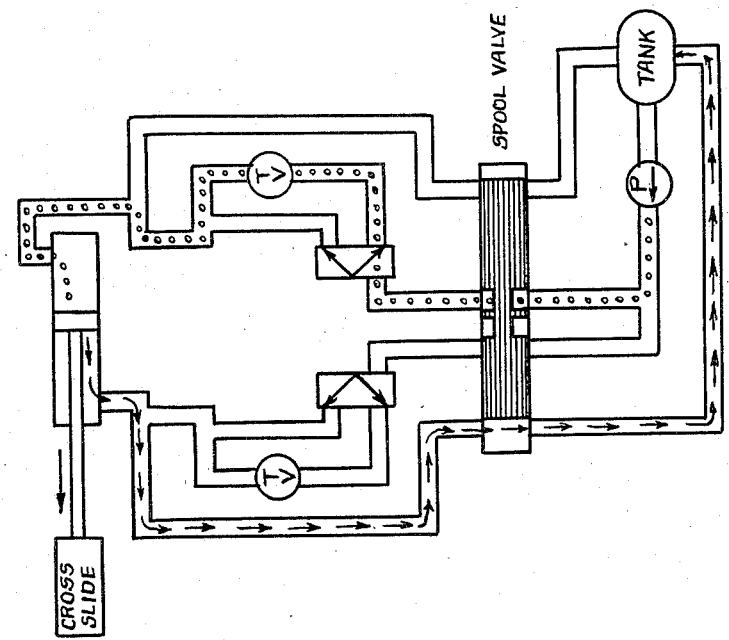

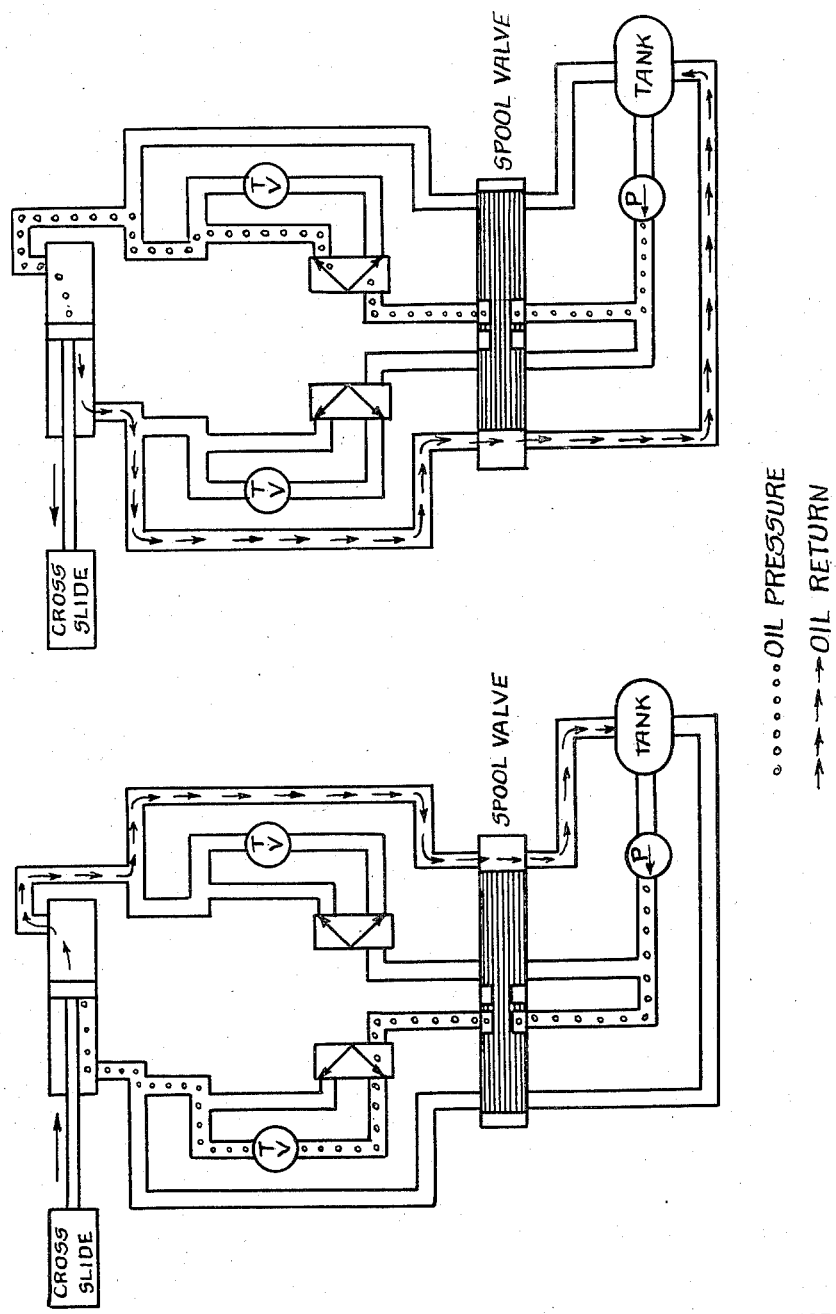

2,925,067

CROSS SLIDE DRIVE

John G. Jones and William S. Mattingly, Decatur, Ill., assignors to A. W. Cash Company, Decatur, Ill., a corporation of Delaware Application March 14, 1957, Serial No. 646,076

5 Claims. (Cl. 121—45)

This invention relates, broadly, to improvements and innovations in fluid actuated positioning and driving mechanisms. More particularly, it relates to a hydraulic cross slide drive for turret lathes operable independently of, or in combination with, an automatic turret drive.

An important object of the invention is the provision of a hydraulic drive and positioning mechanism adapted to be operatively interconnected, for example, with the cross slide of a turret lathe.

Another object of the invention is a master pilot valve combination or assembly having a plurality of actuating elements such as spring loaded detents, which are exposed or accessible, and which are operated by engaging members such as cams, carried by a bar which is relatively movable with respect to the valve, with the engaging members being preferably adjustable on the bar.

Another object of the invention is the provision of such a hydraulic cross slide drive which is capable of fully automatic or semi-automatic operation, and which if desired may be operatively interconnected with an automatic turret drive, for example.

Another object of the invention is the provision of such a hydraulic cross slide drive for turret lathes which is characterized by rugged, foolproof construction capable of long and dependable operation with a minimum of wear, breakdowns, and maintenance.

Still another important object of the invention is the provision of such a hydraulic cross slide drive which is versatile and readily adjustable, thereby permitting new set-ups and changes of operation readily and in a short time.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a top plan view of a turret lathe of known type or make equipped with a hydraulic turret drive and with a hydraulic cross slide constituting one embodiment of this invention;

Fig. 2 is an end elevational view of the turret lathe of Fig. 1 as viewed from the right-hand end in Fig. 1;

Fig. 3 is a side elevational view on enlarged scale of the hydraulic cross slide drive taken on line 3—3 of Fig. 1;

Fig. 4 is an outer end elevational view on enlarged scale of the hydraulic cross slide drive taken on line 4—4 of Fig. 1;

Fig. 5 is a fragmentary top plan view showing the feed bar assembly comprising a portion of the hydraulic cross slide drive;

Fig. 6 is an enlarged fragmentary elevational view partly broken away and in vertical section of a master pilot valve forming a part of the hydraulic cross slide drive shown in Fig. 3;

Figs. 7-10 are diagrammatic views illustrating various stages in the cyclic operation of the hydraulic cross slide drive shown in Figs. 3-6; and Fig. 11 is an electrical circuit diagram showing one manner in which the hydraulic turret drive and hydraulic cross slide drive may be operatively interconnected.

While it will be apparent, as the invention is further described and illustrated, that it has application to other machines and uses, its primary present application is in connection with turret lathes. There are several more or less standard makes or types of turret lathes available from different manufacturers which broadly have the same general construction and mode of operation while varying somewhat in details of design with each make usually having certain special features which characterizes it. Referring initially to Figs. 1 and 2, a turret lathe of the ram type is shown having a bed 5 suitably supported from a base 6. The head stock of the lathe is indicated at 7 having the usual collet chuck 8 projecting therefrom. The hexagon turret is indicated at 10, being mounted upon the turret slide 11. The cross slide is indicated generally at 12.

The present invention pertains specifically to a hydraulic cross slide drive unit or assembly which is indicated generally at 13. The turret lathe shown in Figs. 1 and 2 is also equipped with a hydraulic turret drive comprising a control unit indicated generally at 14 of known type and a hydraulic power cylinder of known type indicated generally at 15. There are several automatic turret drives which as commercially available which may be attached to a ram type turret lathe for automatically actuating or driving the turret. One such hydraulic turret drive, for example, is shown and described in copending application Serial No. 582,514, filed May 3, 1956. This same hydraulic turret drive is also shown and described in a brochure of A. W. Cash Company, of Decatur, Illinois, entitled "Hydraulic Turret Drive for Powering Ram Type Hand Turret Lathes." Another hydraulic turret drive is shown and described in U.S. Patent No. 2,642,649.

Since the present invention is not concerned with the details of construction or details of operation of the hydraulic or automatic turret drive, the same will not be further described except as it is referred to hereinafter in connection with the operation of the hydraulic cross slide drive 13.

The hydraulic cross slide drive 13 comprises a master pilot valve assembly 16 serving to operate and control the double-acting hydraulic power cylinder unit 17, the piston rod 18 of which is connected to the cross slide 12. The master pilot valve 16 is operatively interconnected with the cross slide 12 and the power cylinder 17 by means of a feed bar assembly indicated generally at 20.

The hydraulic cross slide drive 13 is mounted on a bracket 21 which projects from the side of the bed 5. The master control pilot valve 16 is mounted on a platform 22 supported by the bracket 21 while the hydraulic power cylinder 17 is mounted on a platform 23 also carried by the bracket 21.

The construction and operation of the hydraulic cross slide drive 13 will be better understood by first having reference to the diagrams contained in Figs. 7-10. Referring first to Fig. 7, with the pump in operation, oil pressure is transmitted along the path indicated including the spool valve and the throttle valve to the right end connection for the power cylinder. This pressure applied to the right-hand face of the piston forces it to the left carrying the cross slide assembly of the lathe with it. Since the oil pressure flow is restricted, the movement of the piston is slowed. Hydraulic fluid is discharged from the left-hand connection of the power cylinder through the return path indicated which contains no small restrictions offering resistance to rapid fluid flow.

When the end of the stroke to the left is reached, the spool is shifted to the left as shown in Fig. 8. The oil pressure is now allowed to pass unrestricted to the left end of the piston and thereby rapidly moves the piston toward the right. Oil is returned from the right end of the power cylinder. Through operation to be described, the left-hand feed valve is operated to divert the oil pressure through the throttle or needle valve and the resulting restricted flow of pressures moves the piston to the right at slow speed as illustrated in Fig. 9.

At the end of the stroke toward the right the spool is shifted to the right as shown in Fig. 10. In this condition the oil pressure is transmitted through the unrestricted path to the right-hand end of the power cylinder and the oil is returned from the left-hand end. The piston traverses rapidly toward the right until the right-hand feed valve is operated, causing the system to resume the condition illustrated in Fig. 7.

The system broadly illustrated in connection with diagrams contained in Figs. 7-10 is subject to ready adjustment and variation in cycling, and it may be readily interconnected or synchronized with other automatically operating mechanisms such, for example, as the hydraulic turret drive 14 referred to in connection with Figs. 1 and 2.

Reference is now made to Figs. 3-6 for a detailed description of the hydraulic cross slide drive 13 and the mode of operation thereof. The master pilot valve 16 comprises a valve body 25 which is rectangular in cross section and is provided with a horizontal spool cavity 26 in the bottom portion thereof for receiving a reciprocable member such as a spool 27. The spool is inserted from the left-hand side and retained in place by a fitting 28 which is provided on the outer end with an integrally formed valve housing 30. The fitting 28 serves as a cylinder for a plunger 31 carried on the left-hand end of the spool 27.

The spool 27 is provided on the right-hand end with a stem 32 which projects in slidable relation through the right-hand end or right-hand side of the valve body 25 and carries on the outer end thereof a plunger 33. The plunger 33 operates in the cylindrical recess provided by a fitting 34 secured to the right-hand side of the valve body 25 and having integrally formed thereon a valve casing 35.

The valve body 25 is provided at the bottom with a pair of oil pressure connections 36 and 37 and a pair of oil return connections 38 and 40. Oil under pressure is delivered to the connections 36 and 37 from a suitable source, such as a variable speed pump of known type (not shown), the pressure being introduced through the line indicated at 41 (lower right Fig. 3). It will be seen that the oil pressure passes through a T 42 and thence to a cross fitting 43. The pressure inlet connection 36 is connected to the fitting 43 by the conduit or line 44 while the pressure inlet connection 37 is connected thereto by the line 45. The oil return passes from the connection indicated at 46 (Fig. 3) to a receptacle such as a tank, not shown. It will be understood that a variable speed pump and return tank or reservoir form components of hydraulic pressure systems of this type. The oil return connection 46 is connected to one of the ports of a solenoid operated valve 47 of known type, a second port of which is provided with a fitting 48 connected by the line 50 to a T fitting 51. One side of the T fitting 51 is connected to the oil return connection 38 by the line 52 while another connection of the T fitting is connected to the oil return connection 40 by the line 53.

Oil pressure is delivered to the valve casings 30 and 35 by conduit means comprising a line 54 connected to one of the sides of the cross fitting 43 and running to one of the connections of a T fitting 55. An elbow 56 screwed into the pressure inlet port of the valve casing 35 is connected to one of the connections of the T fitting 55 by a short length of conduit 57 while an elbow 58 screwed into the inlet port of the valve casing 30 is connected to the T fitting 55 through the line 60. A T fitting 61 is screwed into an oil return port in the bottom of the valve casing 35 while a similar T fitting 62 is screwed into the oil return port in the bottom of the valve casing 30. An elbow is screwed into the bottom of the valve body 25 so as to communicate with a drain port 64 (Fig. 6) extending up to the right-hand end of the spool cavity 26. Similarly, an elbow 64 is screwed into the bottom of the valve body 25 so as to communicate with a drain bore 66 leading from the left-hand end of the spool recess 26. The elbow 63 is connected to the T 61 by the length of tubing 67 while the elbow 64 is connected to the T 62 by the short length 68.

The top connection of the cross fitting 51 is provided with a T 70, one side of which is connected to the T 61 by the line 71 and the other side of which is connected to the T 62 by the line 72. A third port in the bottom of the solenoid valve 47 is provided with an elbow 73 which is interconnected with the T fitting 42 by the pipe length 74 as shown.

The valve casing 30 houses a pilot valve comprising a hollow valve member or plunger 75 urged upwardly by a compression spring 76 and provided on the upper end with an actuating element in the form of a projecting valve stem 77. The upper end of the casing 30 is closed by gland nut 78. The casing 30 has a pressure inlet port 80 and a pair of ports 81 communicating with the interior of the fitting 28. The oil return port in the bottom of the casing 30 is indicated at 82. As will be noted, the spring 76 normally lifts the plunger 75 so that it closes off the pressure port 80 and the upper port 81.

The valve casing 35 houses a pilot valve which corresponds to that housed in the casing 30 and therefore the corresponding elements are indicated with the corresponding numbers which are primed.

In the left-hand side of the valve body 25 the oil pressure connection 36 communicates with a vertical passage 83 which runs into the inner end of a horizontal passage 84. The outer end of the passage 84 is closed by a plug 85 but inwardly of the plug communicates with an upwardly inclined passage 86. The upper end of the passage 86 communicates with the bottom end of a vertical well 87 in which a feed valve plunger 88 operates. The upper end of the plunger 88 serves as an actuating element in the form of a projecting pin 90 which is surrounded by a cap nut 91 screwed into the top of the valve body 25 as shown. A spring 92 is compressed within the cap 91 and presses up on a washer 93 connected to the pin 90.

A passage 94 extends upwardly on an incline from the left side of the vertical passage 87 and communicates with a main port 95 which is interconnected to the left-hand side of the hydraulic power cylinder 17 by means of a connecting line 96.

A small diameter vertical passageway 97 communicates between the incline passageways 86 and 94 and is provided at the top with a needle-shaped plug member 98, the upper end of which is provided with a slotted screw head 100 by which it may be adjusted so as to vary the size of the restricted opening between the pointed end and the uper end of the passage 97.

To the left and to the rear of the vertical passageway 83 another vertical passageway is provided in the valve body 25 which is indicated in broken line at 101 and communicates with the oil return fitting or connection 38. The upper end of the passageway 101 communicates with a horizontal passageway 102 which in turn communicates with a short vertical passageway 103 which extends up into the port 95. The passageway 102 is provided with a ball check valve comprising a ball 104 urged to the seated position by means of the compression spring 105.

The right-hand side of the valve body 25 is symmetrical with respect to the passageways and members above described and therefore the corresponding passageways, ports and parts are indicated in primed numbers. The master pilot valve assembly 16 is controlled or actuated by means of engaging members adjustably positioned and supported and as part of the feed bar 20, the bar itself being indicated at 106. The feed bar 106 is comprised of T-shaped side members 107 and 108 (Fig. 4) which are turned up on the side so as to provide projecting rail members 110 and 111, respectively, on the sides thereof. Inwardly spaced from the side member 107 is a longitudinal member 112. The longitudinal guides or rails 110 and 111 are slidably suported between four sets of upper and lower rollers 113 and 114, two sets being on the front as shown in Fig. 6 and two being in the rear as indicated in Fig. 4. The sets of rollers 113 and 114 are supported in opposite sides of two hanger assemblies indicated at 115 and 116 which are supported from the adjacent side of the power cylinder 17 by means of the vertical plate 117 (Figs. 4 and 5). The feed bar or control bar 106 is thus easily slidable in either direction over the top of the valve body 25.

The feed bar 106 serves as a support for a pair of elongated cam shoes 118 and 120 which are elongated and have vertically extending suport bolts 121—121 and 122—122, respectively. The bolts 121 and 122 are provided at the top with heads having integrally formed washers which serve to support the same on the top surfaces of the bar 106. It will be seen that by loosening the bolts 121 and 122 the cam shoes 118 and 120 may be readily shifted to different positions lengthwise with respect to the bar 106.

Also supported from the bar 106 adjacent the outer ends thereof are cam members 123 and 124 (Fig. 3), the cam member 123 being supported by a bracket designated at 125 and the cam member 124 being supported by a bracket member designated at 126. The bracket members 125 and 126 are adjustably positioned on the bar 106 by pairs of clamping screws 127—127 and 128—128, respectively.

The bar 106 also serves to support a limit switch 130 (Fig. 3) of known type, this being mounted on the top of the hanger 116. The limit switch 130 is closed when a roller 131 engages a button 132 projecting from the top of the bar 106. The button 132 is readily adjustable on the bar 106 in that it is the cap portion of a cap screw extending downwardly through the bar 106 and slidably therealong. The roller or wheel 131 is mounted on the bottom end of an arm 133 pivotally supported from the bottom of the switch 130 and carrying a contact element 134 which is adapted to close with the contact 135.

The operation of the master pilot valve 16 is as follows: Starting out with all of the parts thereof in the positions shown in Fig. 6: In this condition of the valve the bar 106 is traveling at slow speed to the left, being moved in that direction through its connection to the cross slide 12 through the vertical member 136 depending from the left end of the feed bar 106 as shown in Fig. 3. At the bottom end the bar 136 connects with the horizontal extension 137 provided with a horizontal slot 138 through which are screwed two clamping bolts 140—140 which turn into the tapped outer ends of a pair of projections 141—141 (Fig. 5) extending from the side of the cross slide 12.

Oil pressure is introduced from the source or inlet 41 upwardly through the inlet connection 37. A reduced diameter portion 142 of the spool 27 is in register with the vertical passage 83' and the oil pressure flows upwardly into the horizontal passage 84', thence to the inclined passage 86'. The plunger 88' of the right feed valve is in its downward position, being held there by the cam shoe 118 which holds down the upper end of the plunger pin 90', as shown. Hence the oil pressure cannot flow upwardly through the vertical well 87' into the inclined passage 94' but can flow upwardly through the restricted vertical passage 97', the flow being metered by adjustment of the needle or conical member 98'. The oil pressure is thus communicated to the inclined passage 94' and thence to the port 95' from which it is transmitted through the connection 96' to the right-hand side of the power cylinder 17. The pressure applied to the right-hand side of the plunger within the power cylinder 17 is able to shift it slowly to the left since the oil on the left-hand side of the piston may be expelled and returned through the line 96 into the port 95, thence down the vertical passage 103 where it serves to unseat the ball member 104 and then flow through the horizontal passage 102 and down through the vertical passage 101 and out through the return fitting 38.

The feed bar 106 continues to move at slow speed towards the left under the conditions described until the right-hand cam member 123 engages the upper end of the projecting valve stem 77' of the right-hand pilot valve. Thereupon this valve stem is depressed and lowers the valve member or plunger 75' sufficiently so as to open the pressure port 80' and permit oil under pressure to pass into the fitting 34 where it acts on the right-hand face of the plunger 33 and shifts the spool 27 to the left. When shifted to the left the vertical passageways 83' and 101 are blocked by full diameter portions of the spool 27. However, the reduced diameter portion 143 will now register with the vertical passageway 83 while the right-hand end of the spool member 27 has now cleared the vertical passageway 101'. Accordingly, oil pressure is now shut off from the pasageway 83' but is applied upwardly through the passageway 83, thence through the horizontal passage 84, the upwardly inclined passage 86 and through the well 87 into the inclined passage 94. The oil pressure is permitted to flow unrestricted since the plunger member 88 is in the upper position as shown. Therefore, the oil pressure flows unrestricted out through the orifice or port 95 and through the connection 96 into the left-hand side of the power cylinder 17. The pressure forces the piston toward the right and the oil is returned from the right-hand end of the cylinder through the connection 96' and downwardly through the passage 103', where it unseats the ball valve 104' and then passes downwardly through the vertical passage 101' and out through the return connection 40. As the bar 104 shifts to the right the plunger 90' is allowed to rise but the oil pressure does not flow down through the passages 94', 87', 86', 84' and 83' since the spool is blocking the passage 83'. It will be noted that the oil pressure is shut off from the right-hand side of the plunger 33 as soon as the bar 106 starts to shift to the right removing the cam member 123 from the plunger 77'. However, the spool 27 remains in position since it is not acted upon from either end at this time by an unbalanced force.

Continued rapid movement of the bar 106 to the right brings the left cam shoe 120 into engagement with the stem 90 and serves to depress it so that the plunger 88 closes off the bottom end of the inclined passage 94. This forces the oil pressure to be diverted upwardly through the restricted or small passage 97 with metered flow past the needle member 98. Accordingly, the rapid traverse of the bar 106 to the right is interrupted and is moved at slow or working speed until such time as the cam 124 engages the valve stem 77 of the pilot valve on the left-hand side which applies oil pressure to the left-hand end of the plunger 31 and forces the spool to the right.

By positioning the cams 123 and 124 it will be seen that the position and length of the stroke of the bar 106 can be controlled. Likewise, by adjustably positioning the elongated cam shoes 118 and 120 the commencement and ending of the slow speed traverse of the bar 106 may be controlled.

When the switch-actuating button 132 engages the roller 131 it will close the limit switch 130 and this will energize the solenoid valve 47 which is of known type and which serves to close off the oil return path through the dotted line which is designated at A in Fig. 3 while opening up the by-pass path B between the port having the elbow 73. Since the oil return is shut off, the piston is frozen in position and the oil pressure is by-passed and recirculated to the tank. Obviously, several buttons similar to button 132 may be positioned along the bar 106 so as to interrupt the cycle of the valve at any desired point. When the solenoid valve 47 is returned to its operating condition the pilot valve 16 resumes its cycle of operation at whatever point it was interrupted.

For a description of one electrical control circuit that may be used for the master pilot valve 16 which involves coupling it in electrical circuit relationship with a control switch carried and operated by the turret drive 14, reference may now be had to Fig. 11 of the drawings. The switch 130 is shown with conductors 145 and 146 connecting it to a suitable voltage source designated by the two conductors 147. The output terminals of the switch 130 are connected by conductors 148 and 150 to one pair of terminals of the solenoid valve unit 47. When the switch 130 is closed by the operating button 132 engaging the wheel 131, the switch 130 passes current through the conductors 148 and 150 and energizes the solenoid valve 47 so as to actuate it to one of its two positions, as described. The solenoid valve unit 47 remains in that position after the switch 130 is opened until such time as it is energized for movement into the alternate position. This energization for the alternate movement may be obtained or effected, for example, by means of a switch 151 which may be of the same type as switch 130. For example, the switch 151 may be mounted for actuation by a moving part of the automatic turret drive 114 as indicated in Fig. 1. When the switch 151 is closed it serves to energize the solenoid valve unit 47 and remove it to the reverse position. The switch 151 may be energized by current delivered through the conductors 152 and 153 which are interconnected with the power source 147. The output terminals of the switch 151 are connected to the solenoid 47 through the conductors 154 and 155.

The operation of the master pilot valve 13 or the hydraulic cross slide drive 13 in cooperation with the turret drive 14 will be readily apparent from the foregoing description. For example, assume that the hydraulic cross slide drive 13 is to be used to perform two operations on a piece part during a complete cycle, one being carried on the stroke toward the lathe and one being carried on the stroke away from the lathe. The switch 151 on the turret drive 14 is then positioned so that it is actuated twice during the complete cycle of the turret drive, these two positions or the timing thereof being easily selected in known manner. It will be apparent that using only one switch-actuating button 132 that the switch 130 will be actuated on the forward stroke and the return stroke of the feed bar 106, that is, it will be actuated twice during the complete cycle of operation of the hydraulic cross slide drive 13.

By way of example, the turret drive 14 may be permitted to carry out three out of five operations in its cycle after the third of which the switch 151 will be activated so as to bring the solenoid switch 47 into the condition where oil pressure is passed through the master control valve 20. This will cause the hydraulic cross slide drive 13 to operate and complete its movement either in one direction or the other as the case may be, which movement includes a slow or restricted traverse period in which a tool is brought into operation against a piece part in the lathe. When this operation is completed and the bar 106 is reciprocated in the opposite direction, the switch 130 will be operated and the cross slide drive 13 turned off. It remains turned off until the switch 151 is again actuated, say, after the completion of the fifth operation of the cycle of the turret drive 14, whereupon the cross slide drive is again activated and permitted to complete the rest of the cycle which will bring a second tool into operation on the piece part in the lathe.

Obviously, many different arrangements could be worked out and easily provided for intercontrolling the turret drive 14 and the cross slide drive in any desired manner.

If a turret lathe is not provided with an automatic turret drive such as 14, then the cross slide drive 13 may be operated by a switch 156 which is comparable to switch 151 but which is actuated by means of a button 157 carried on the side of the turret 10. Obviously, if desired, both switches 151 and 156 may be utilized as part of a control circuit.

While the hydraulic cross slide drive 13 has been described specifically in connection with a turret lathe, it will be apparent that it could be used for many other applications wherein it is desired to reciprocate a machine part or element in a controlled manner with various stops and at different rates of speed.

Since certain further changes and modifications will be obvious and other embodiments of the invention may be provided without departing from the spirit and scope thereof, all matter described above or shown in the accompanying drawings is intended to be interpreted as illustrative and not in a limiting sense.

What is claimed as new is:

1. A master pilot valve including means for operating the same comprising: a valve body having two pressure ports adapted to be connected to a source of fluid pressure, two fluid return ports adapted to be connected to a fluid reservoir, and two main ports adapted to be connected to opposite ends, respectively, of a double-acting cylinder unit; a first pair of feed valves within said valve body one serving alternately to permit unrestricted flow and restricted flow to one of said main ports and the other serving alternately to permit unrestricted and restricted flow to the other of said main ports, each of said first pair of feed valves having actuating elements projecting from said valve body; a spool valve within said valve body which in one position of the spool transmits fluid pressure to one of said main ports and allows fluid to return through the other and which in an alternate position reverses the fluid pressure and fluid return to and through said main ports; a pair of pilot valves which operate alternately to shift said spool valve to its alternate positions, said pilot valves having projecting actuating elements; a feed or control bar; means supporting said feed bar for reciprocable movement with respect to said valve body; and an engaging member for each of said four actuating elements supported by said feed bar and engageable therewith for operating the same.

2. The combination called for in claim 1 wherein said actuating elements for the first pair of feed valves project above said valve body and said actuating elements of the second pair of pilot valves project from opposite sides of said body, wherein said actuating elements are aligned in the direction in which said feed bar is reciprocable, and wherein said engaging members are cam shoes.

3. The combination called for in claim 2 wherein said engaging members are adjustably positioned along the length of said feed bar.

4. The combination called for in claim 2 wherein said actuating elements are spring-biased in an outward direction from the respective pairs of valves and wherein said engaging members are cam shoes having inclined surfaces at the leading ends and flat elongated trailing surfaces.

5. A master pilot valve including means for operating the same comprising a valve body having two pressure ports adapted to be connected to a source of fluid pressure, two fluid return ports adapted to be connected to a fluid reservoir, and two main ports adapted to be connected to opposite ends, respectively, of a double-acting cylinder unit, a pair of feed valves within said valve body, one feed valve serving alternately to permit unrestricted flow and restricted flow to one of said main ports and the other feed valve serving alternately to permit unrestricted and restricted flow to the other of said main ports, each of said pair of feed valves having actuating elements projecting from said valve body, a reciprocable member within said valve body which in one position of the member transmits fluid pressure to one of said main ports and allows fluid to return to the other and which in an alternative position reverses the fluid pressure and fluid return to and through said main ports, a pair of pilot valves which operate alternately to shift said reciprocable member to its alternate positions, said pilot valves having projecting actuating elements, a control bar, means supporting said control bar for reciprocable movement with respect to said valve body, and an engaging member for each of said actuating elements supported by said control bar and engageable therewith for operating the same.

References Cited in the file of this patent

UNITED STATES PATENTS

| | | |
|---|---|---|
| 2,000,553 | Alden | May 7, 1935 |
| 2,063,414 | Tweddell | Dec. 8, 1936 |
| 2,067,492 | Kingsbury | Jan. 12, 1937 |
| 2,216,486 | Cooke | Oct. 1, 1940 |
| 2,442,868 | Dare | June 8, 1948 |
| 2,565,600 | Esterline | Aug. 28, 1951 |
| 2,579,566 | Godfriaux | Dec. 25, 1951 |
| 2,798,460 | Mathys | July 9, 1957 |
| 2,849,986 | Klopp | Sept. 2, 1958 |